(12) United States Patent
Weng

(10) Patent No.: US 11,119,388 B2
(45) Date of Patent: Sep. 14, 2021

(54) LENS SCREENING DEVICE

(71) Applicant: FUNDER ELECTRONIC GLOBAL CO., LTD., Taipei (TW)

(72) Inventor: Wai-How Weng, Taipei (TW)

(73) Assignee: FUNDER ELECTRONIC GLOBAL CO., LTD., Taipei (TW)

( * ) Notice: Subject to any disclaimer, the term of this patent is extended or adjusted under 35 U.S.C. 154(b) by 63 days.

(21) Appl. No.: 16/790,754

(22) Filed: Feb. 14, 2020

(65) Prior Publication Data

US 2020/0218132 A1 Jul. 9, 2020

Related U.S. Application Data

(63) Continuation-in-part of application No. 16/243,053, filed on Jan. 8, 2019, now abandoned.

(51) Int. Cl.
*G03B 11/04* (2021.01)
*H04N 5/225* (2006.01)

(52) U.S. Cl.
CPC .......... *G03B 11/043* (2013.01); *G03B 11/041* (2013.01); *H04N 5/2252* (2013.01); *H04N 5/2254* (2013.01); *H04N 5/2257* (2013.01)

(58) Field of Classification Search
CPC .................................................. G03B 11/041
USPC ......................................................... 396/448
See application file for complete search history.

(56) References Cited

U.S. PATENT DOCUMENTS

| | | | | |
|---|---|---|---|---|
| 2,345,365 A * | 3/1944 | Steiner | ..................... | G03B 9/08 |
| | | | | 396/439 |
| 5,150,149 A * | 9/1992 | Alligood | ................ | G03B 7/087 |
| | | | | 396/242 |
| 5,173,728 A * | 12/1992 | Sangregory | .............. | G03B 9/10 |
| | | | | 310/191 |
| 5,264,896 A * | 11/1993 | Lee | ........................ | G03B 7/087 |
| | | | | 396/235 |
| 7,338,221 B2 * | 3/2008 | Oishi | ....................... | H02K 1/14 |
| | | | | 396/458 |
| 2007/0172231 A1 * | 7/2007 | Durfee | ..................... | G03B 9/22 |
| | | | | 396/463 |
| 2009/0052886 A1 * | 2/2009 | Watanabe | ............ | H04N 5/2254 |
| | | | | 396/486 |
| 2016/0357089 A1 * | 12/2016 | Takahashi | ................ | G03B 9/02 |

* cited by examiner

*Primary Examiner* — Clayton E. LaBalle
*Assistant Examiner* — Dennis Hancock
(74) *Attorney, Agent, or Firm* — Leong C. Lei

(57) ABSTRACT

A lens screening device includes a housing and plate body, the housing has through holes, and the inside of the housing is configured with the plate body, which is acted by coils and magnetic elements to swing, thereby exposing or closing the through holes. The present invention is characterized in that a plurality of guide rails is configured inside the housing, the bottom surface of the plate body is in contact with the guide rails, and the bottom surface of the plate body is configured with at least one shallow groove, thereby reducing the weight, achieving a thin, lightweight structure.

5 Claims, 7 Drawing Sheets

US 11,119,388 B2

LENS SCREENING DEVICE

CROSS REFERENCE TO RELATED APPLICATIONS

This is a continuation-in-part application of co-pending U.S. patent application Ser. No. 16/243,053, "Lens Screening Device", filed on Jan. 8, 2019.

TECHNICAL FIELD OF THE INVENTION

The present invention relates to a lens screening device, and more particularly to a lens screening device using a plate body to expose a lens after the plate body is swung, preventing camera shooting from being carried out without consent, thereby protecting privacy.

DESCRIPTION OF THE PRIOR ART

The camera lenses of general electronic products provided with image pickup and network communication functions such as smart phones are mainly turned on or off through microprocessors. But, because of the madness of internet hackers, the network communication modules of the electronic devices are still probably invaded by the hackers to control the microprocessors to open camera lenses to carryout image pickup and then to take picture of user' privacy in secret without users' knowledge even if the camera lenses are closed in the first place. Furthermore, when the electronic products mentioned above are used in video communication, the camera lens will be turned on automatically to carry out image pickup once the user pick up a telephone, making the user have to disclose the image of their location and unable to protect personal privacy.

SUMMARY OF THE INVENTION

To overcome the defects mentioned above, the present invention proposes a lens screening device, including: a fan-shaped housing, a top surface and bottom surface thereof respectively having a corresponding through hole, an inside of the housing having a first accommodation space in communication with the through holes, a plurality of spaced curved guide rails configured in the first accommodation space, the first accommodation space further recessed with a second accommodation space, a shaft and iron core configured inside the second accommodation space, two ends of the iron core bended to be parallel and opposite to each other, an inside of the iron core configured with two concave portions corresponding to each other, two sides of the iron core respectively configured with a coil support, one end of each of the coil supports configured with a lead seat, a first coil and second coil wound around the corresponding coil supports, one end of the first coil and one end of the second coil configured on the corresponding lead seats, one of the lead seat providing an electric connection with a positive lead and the other one a negative lead, another end of the positive lead and another end of the negative lead in combination with a terminal in electric connection with an external power source; and a plate body, configured in the first accommodation space, a bottom surface of the plate body in contact with each of the guide rails, the bottom surface or a top surface of the plate body configured with at least one shallow groove, thereby reducing the weight of the plate body, one end of the plate body configured with a tube, an outer side of the tube configured a plurality of spaced positioning elements, the tube in combination with a magnetic element, a top surface of the magnetic element configured with a plurality of spaced positioning grooves for the engagement with the corresponding positioning elements, the tube coupled pivotally to the shaft, and the plate body positioned between the through holes, the magnetic element having a positive pole and negative pole, thereby allowing the magnetic fields of the first coil and second coil to be magnetically attracted and repelled to the position pole and negative pole after current is applied to cause the magnetic element to be pivotally rotated and drive the plate body to move to expose and close the through holes.

DETAILED DESCRIPTION OF THE PREFERRED EMBODIMENTS

Figure 1:
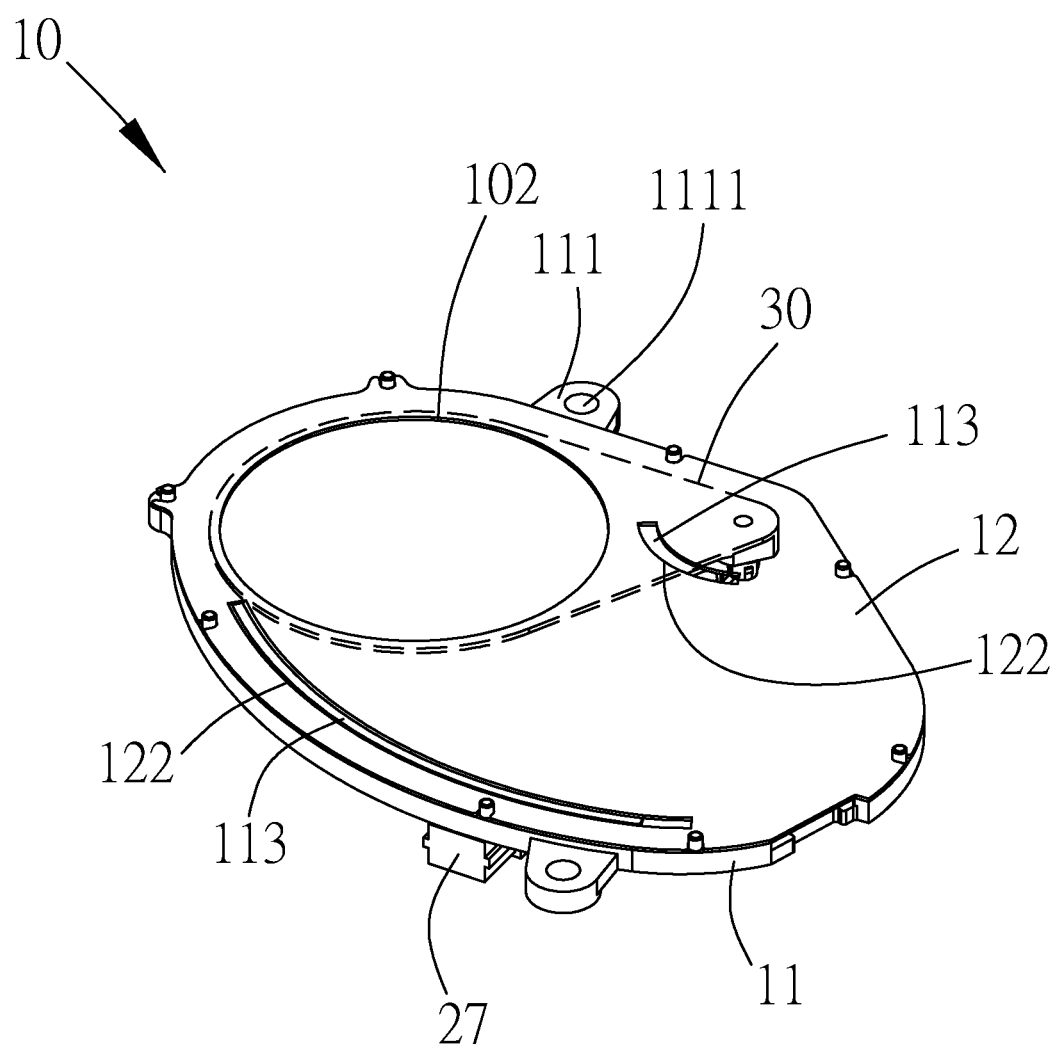
FIG. 1 is a perspective view of the present invention.
Figure 2:
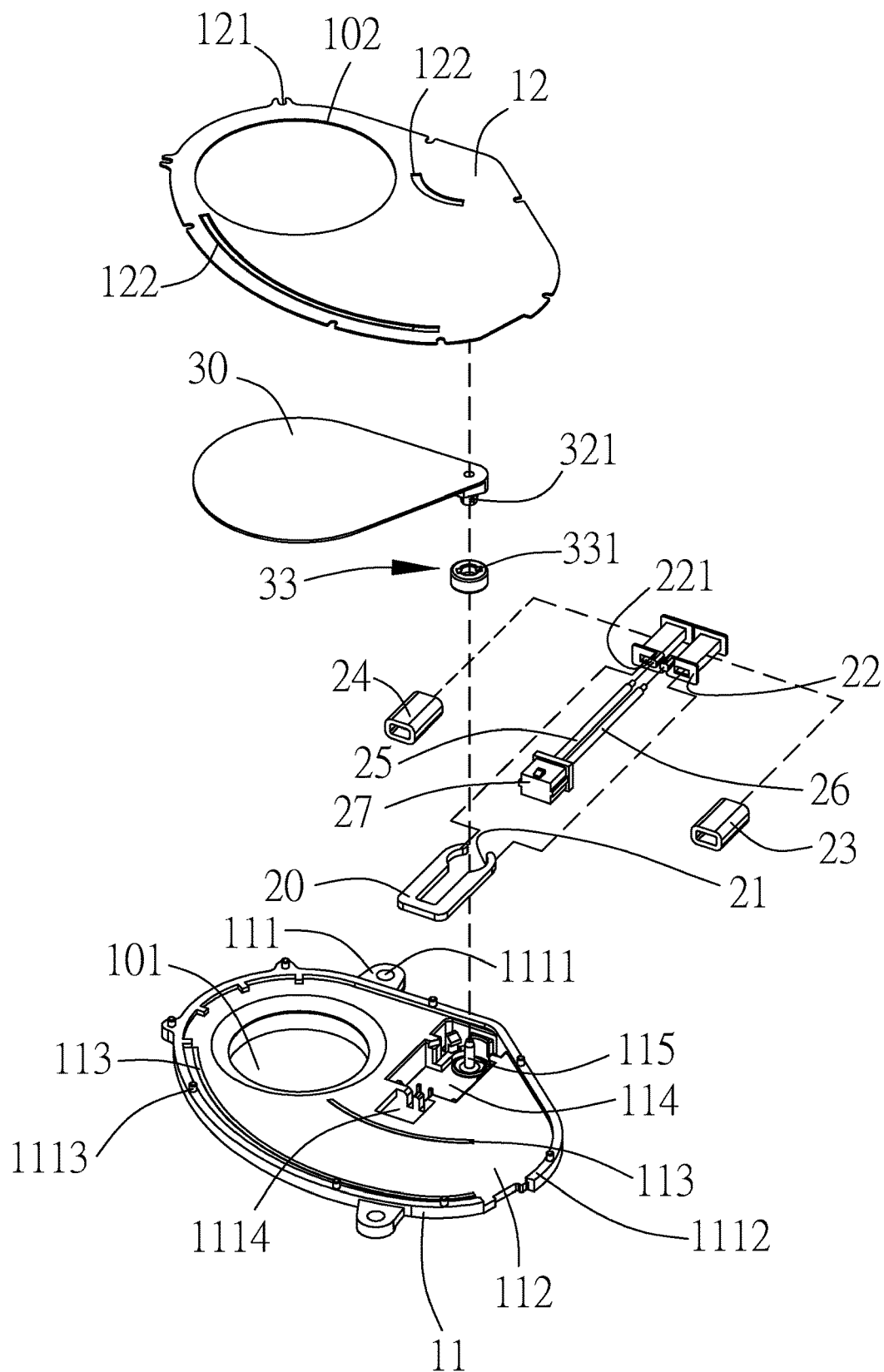
FIG. 2 is an exploded view of the present invention.
Figure 3:
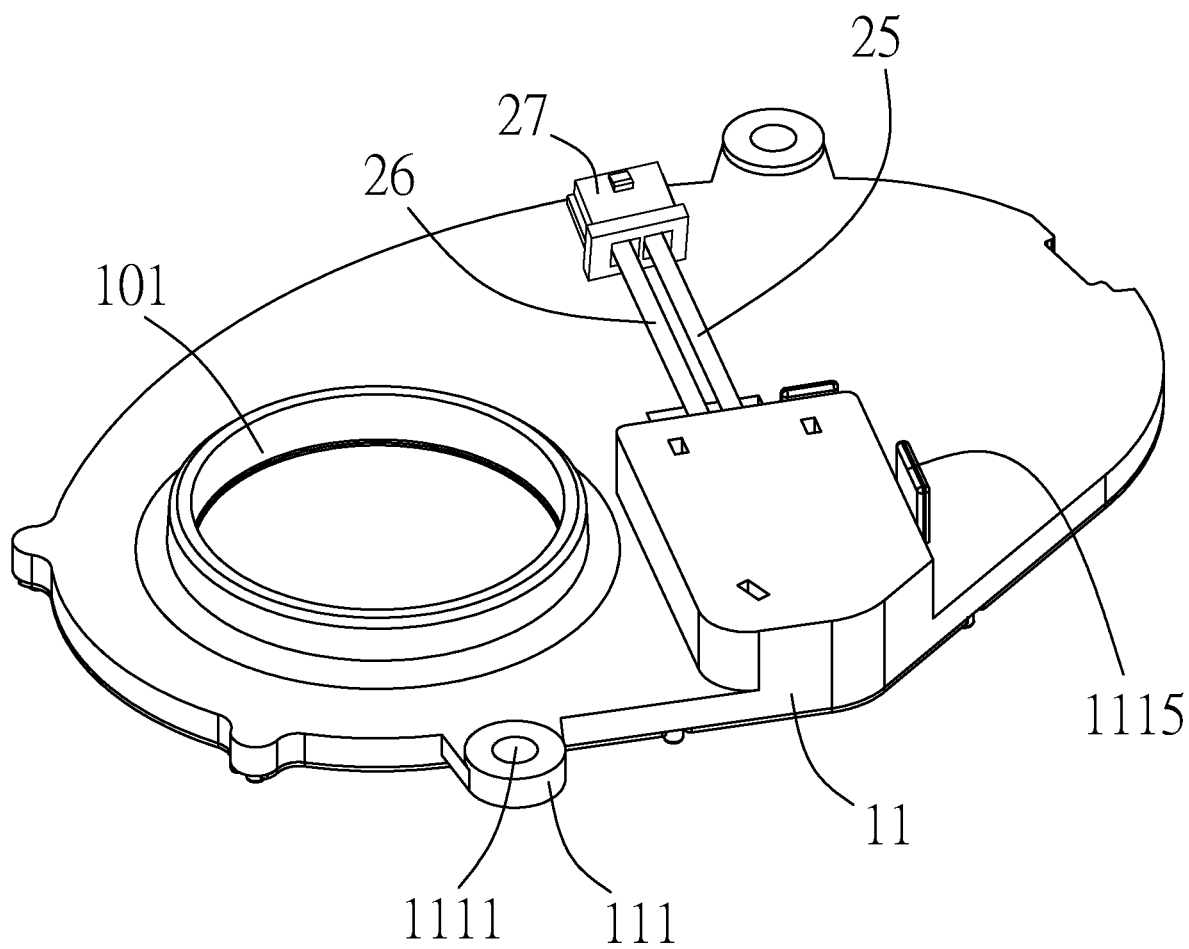
FIG. 3 is a perspective view of a lower shell of the present invention viewed from another angle.

Referring to FIGS. 1 to 3, a lens screening device of the present invention includes a fan-shaped housing 10, the top surface and bottom surface of which respectively have a through hole 101 and through hole 102 corresponding to each other, where the housing 10 includes a lower shell 11 and cover 12, on which the through holes 101. 102 are respectively configured, and a plurality of coupling portions 111 are extended outward from the edge of the lower shell 11; a predetermined distance exists between each two adjacent coupling portions 111, and each of the coupling portions 111 has a through hole 111 for the coupling of it to an external device (not shown in the figures.

Furthermore, the periphery of the lower shell 11 has a vertical wall 1112, on the top surface of which a plurality of spaced engagement elements 1113 are configured, and the periphery of the cover 12 is recessed with a plurality of spaced engagement grooves 121.

Furthermore, the inside of the housing 10 has a first accommodation space 112 in communication with the through holes 101, 102, and the engagement elements 1113 are in combination with the corresponding engagement grooves 121 so as to seal the first accommodation space 112.

A plurality of spaced curved guide rails 113 are configured in the accommodation space 112, and a plurality of curved hole corresponding thereto are configured on the cover 12. Whereby, the guide rails 113 are in engagement with the corresponding curved holes 122 so as to allow the lens screening device of the present invention to be thinner after the cover 12 is coupled to the lower shell 11.

The first accommodation space 112 further has a second accommodation space 114, inside which a shaft 115 and iron core 20 are configured, where the two ends of the iron core 20 are bended to be parallel and opposite to each other, and the inside of the iron core 20 is configured with two concave portions 20 corresponding to each other. Furthermore, the two sides of the iron core 20 are respectively configured with a coil support 22, one end of which is configured with a lead seat 221, and a first coil 23 and second coil 24 are wound around the corresponding coil supports 22, where one end of the first coil 23 and one end of the second coil 24 are configured on the corresponding lead seats 221, and the lead seats 221 are in electric connection with a positive lead 25 and negative lead 26, where another end of the positive lead 25 and another end of the negative lead 26 are coupled to a terminal 27 and so in electric connection with an external power source.

The lower shell 11 further has a bottom hole 1114 adjacent to the second accommodation space 114, which is adapted to allow the positive lead 25, negative lead 26 and terminal 27 to be passed through and positioned outside the lower shell 11.

Figure 4:
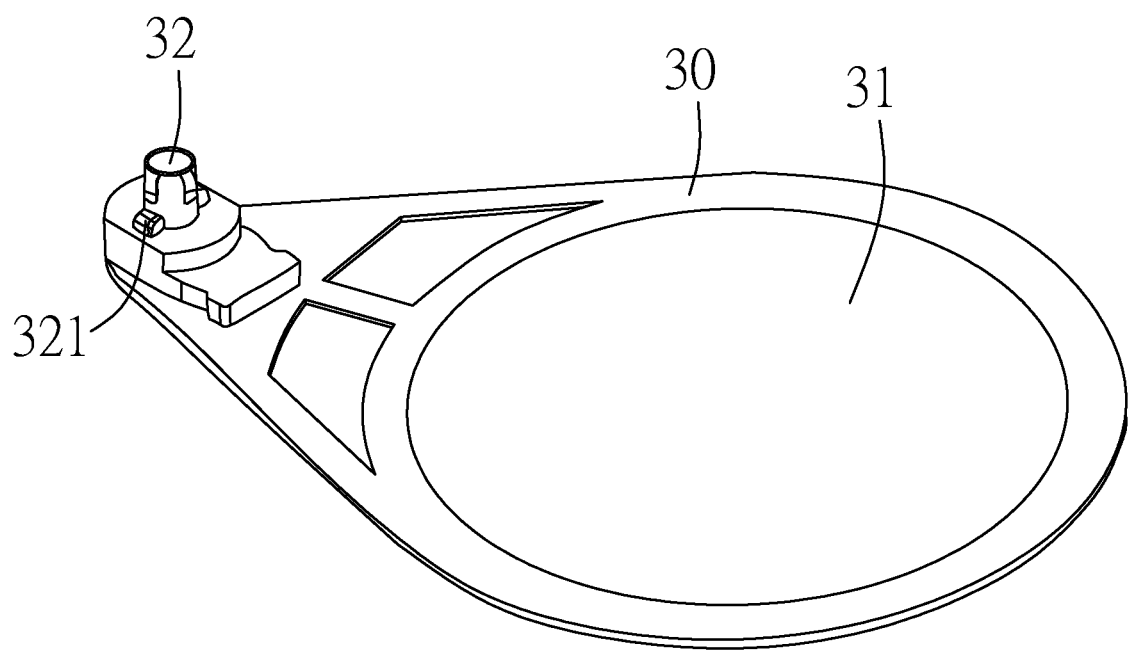
FIG. 4 is a perspective view of a plate body of the present invention viewed from another angle.
Figure 5:
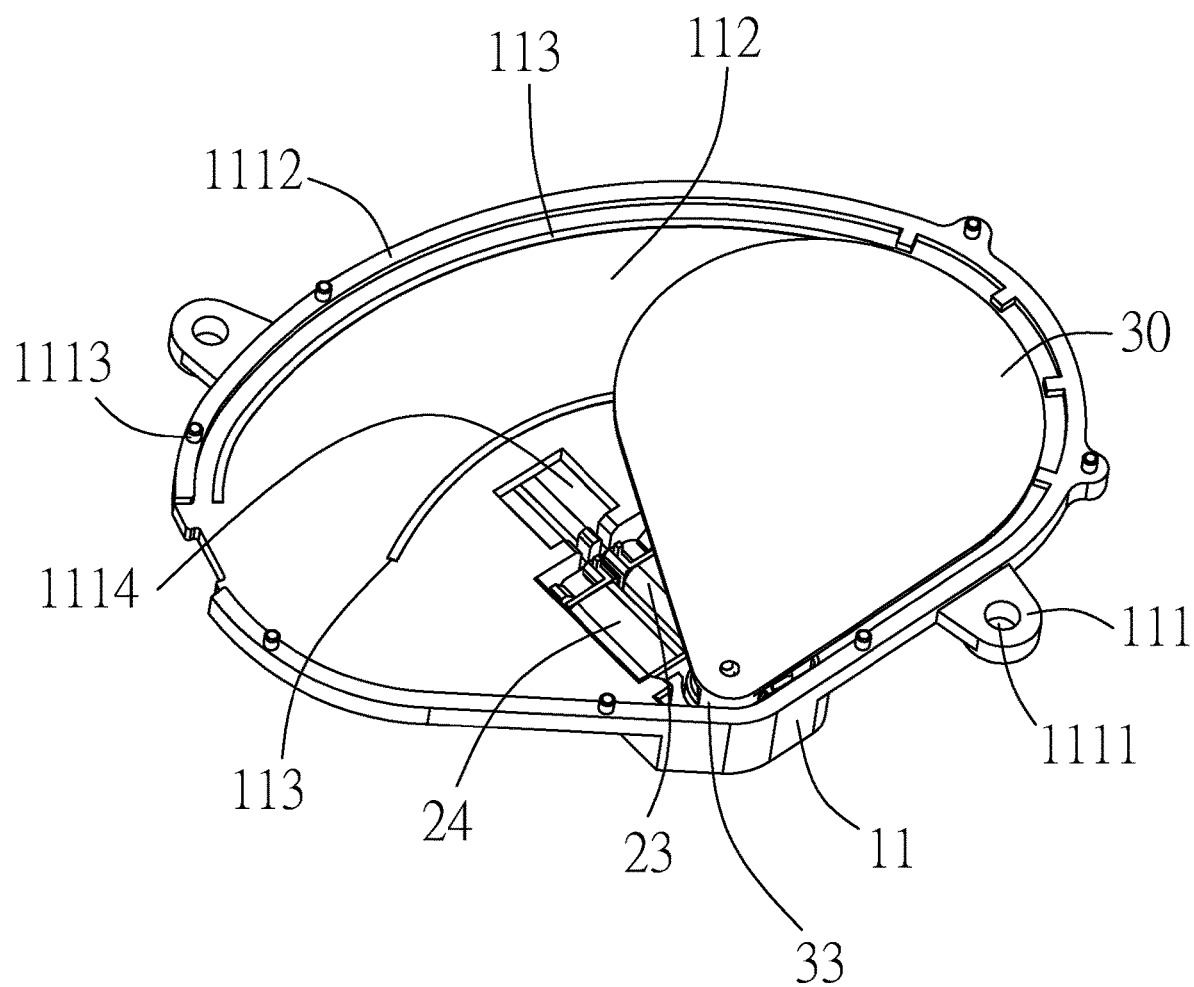
FIG. 5 is a perspective view of the present invention in a screening state.
Figure 6:
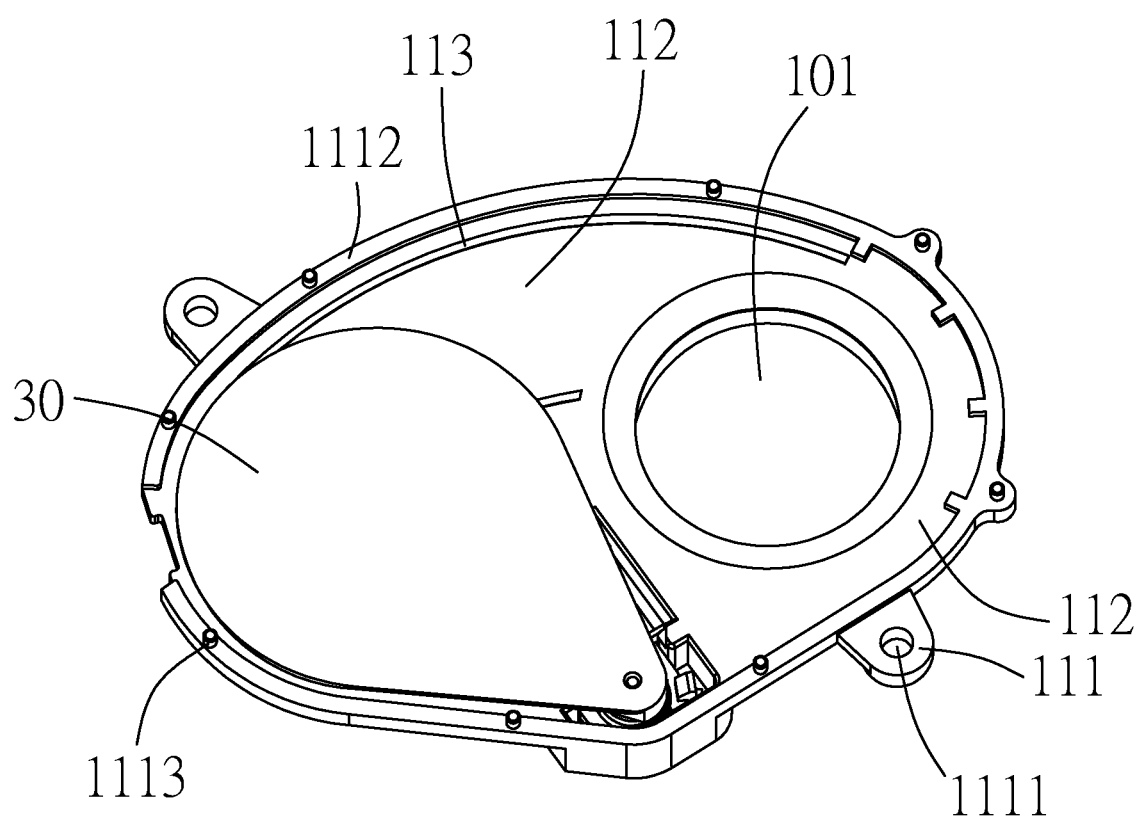
FIG. 6 is a perspective view of the present invention in an open state.

Referring to FIGS. 2 and 4, a plate body 30 is configured in the first accommodation space 112, where the bottom surface of the plate body 30 is in contact with each of the guide rails 113, and the bottom surface or top surface of the plate body 30 is configured with at least one shallow groove 31 for the reduction of the weight of the plate body 30.

One end of the plate body 30 is configured with a tube 32, on the outside of which a plurality of spaced positioning elements 321 are configured, and the tube 32 is in combination with a magnetic element 33, on the top surface of which a plurality of positioning groove 331 are configured for the engagement with the corresponding positioning element 321. Furthermore, the tube 32 is coupled pivotally to the shaft 115.

The plate body 30 is positioned between the through holes 101 and 102, and the magnetic element 33 has positive and negative poles. Whereby, the magnetic fields of the first coil 23 and second coil 24 are magnetically attracted and repelled to the positive electrode portion and the negative electrode portion after the current is applied, allowing the magnetic element 33 to be pivotally rotated and drive the plate body 30 to move so as to expose and close the through holes 101, 102. Since the lens screening device of the present invention is mounted on an electronic device with a lens, the through holes 101, 102 correspond to the lens so that photography cannot be performed when the plate body 30 closes the through holes 101 and 102, achieving privacy protection.

Figure 7:
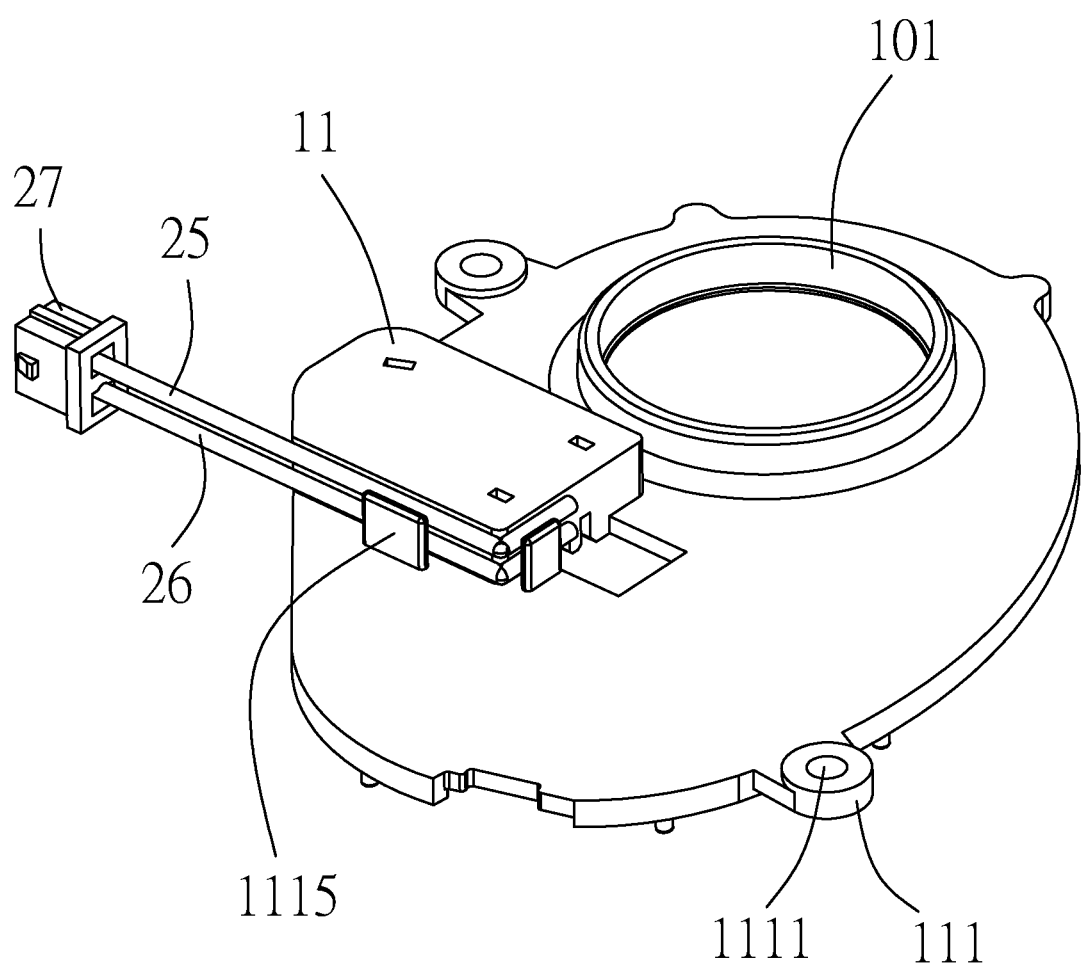
FIG. 7 shows another form that continues FIG. 3.

Referring to FIGS. 2 and 7, the bottom surface of the lower shell 11 is protruded with at least one stopper 1115 having a gap with the outer side of the second accommodation space 114, and the positive lead 25 and negative lead 26 are configured inside the gap. In other words, the stopper 1115 is a cable management mechanism adapted to provide users with the ability to pull the positive lead 25 and negative lead 26 neatly and accurately to other places according to the requirements.

I claim:

1. A lens screening device, comprising:
a fan-shaped housing, a top surface and bottom surface thereof respectively having a corresponding through hole, an inside of said housing having a first accommodation space in communication with said through holes, a plurality of spaced curved guide rails configured in said first accommodation space, said first accommodation space further recessed with a second accommodation space, a shaft and iron core configured inside said second accommodation space, two ends of said iron core bended to be parallel and opposite to each other, an inside of said iron core configured with two concave portions corresponding to each other, two sides of said iron core respectively configured with a coil support, one end of each of said coil supports configured with a lead seat, a first coil and second coil wound around said corresponding coil supports, one end of said first coil and one end of said second coil configured on said corresponding lead seats, one of said lead seat providing an electric connection with a positive lead and the other one a negative lead, another end of said positive lead and another end of said negative lead in combination with a terminal in electric connection with an external power source; and a plate body, configured in said first accommodation space, a bottom surface of said plate body in contact with each of said guide rails, said bottom surface or a top surface of said plate body configured with at least one shallow groove, thereby reducing the weight of said plate body, one end of said plate body configured with a tube, an outer side of said tube configured a plurality of spaced positioning elements, said tube in combination with a magnetic element, a top surface of said magnetic element configured with a plurality of spaced positioning grooves for the engagement with said corresponding positioning elements, said tube coupled pivotally to said shaft, and said plate body positioned between said through holes, said magnetic element having a positive pole and negative pole, thereby allowing the magnetic fields of said first coil and second coil to be magnetically attracted and repelled to said position pole and negative pole after current is applied to cause said magnetic element to be pivotally rotated and drive said plate body to move to expose and close said through holes.

2. The device according to claim 1, wherein said housing comprises a lower shell and cover, said through hole are respectively configured on said lower shell and cover, an edge of said lower shell is extended outward with a plurality of coupling portions, a predetermined distance exists between each said two adjacent coupling portions, and each of said coupling portions is configured with a through hole for the combination of each of said coupling portions with an external device.

3. The device according to claim 2, wherein a periphery of said lower shell has a vertical wall, a top surface of said wall is configured with a plurality of spaced engagement elements, a periphery of said cover is recessed with a plurality of spaced engagement grooves, and said engagement elements are in combination with said corresponding engagement grooves, thereby sealing said first accommodation space.

4. The device according to claim 2, wherein said lower shell further has a bottom hole adjacent to said second accommodation space, and said bottom hole allows said positive lead, negative lead and terminal to be passed through and positioned outside said lower shell.

5. The device according to claim 4, wherein a bottom surface of said lower shell is protruded with at least one stopper having a gap with an outside surface of said second accommodation space, and said positive lead and negative lead are configured in said gap.

* * * * *